US012717345B2

(12) United States Patent
Yaguma et al.

(10) Patent No.: US 12,717,345 B2
(45) Date of Patent: Aug. 25, 2026

(54) AUTONOMOUS MOVING APPARATUS

(71) Applicant: ROHM CO., LTD., Kyoto (JP)

(72) Inventors: Hiroshi Yaguma, Kyoto (JP); Masahiro Yasuda, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 44 days.

(21) Appl. No.: 18/677,154

(22) Filed: May 29, 2024

(65) Prior Publication Data

US 2024/0310854 A1 Sep. 19, 2024

Related U.S. Application Data

(63) Continuation of application No. PCT/JP2022/045293, filed on Dec. 8, 2022.

(30) Foreign Application Priority Data

Dec. 9, 2021 (JP) ................................ 2021-200379

(51) Int. Cl.
*G05D 1/622* (2024.01)
*G05D 109/10* (2024.01)
(Continued)

(52) U.S. Cl.
CPC ......... *G05D 1/622* (2024.01); *G05D 2109/10* (2024.01); *G05D 2109/20* (2024.01); *G05D 2111/30* (2024.01)

(58) Field of Classification Search
CPC ............... G05D 1/622; G05D 2111/30; G05D 2109/20; G05D 2109/10
(Continued)

(56) References Cited

U.S. PATENT DOCUMENTS

2020/0338742 A1 10/2020 Yamaguchi et al.
2020/0358180 A1* 11/2020 Ito ....................... H01Q 3/2652
(Continued)

FOREIGN PATENT DOCUMENTS

CN 109814571 A 5/2019
JP 2000009836 A * 1/2000
(Continued)

OTHER PUBLICATIONS

English Translation for JP-2000009836-A (Year: 2025).*
(Continued)

*Primary Examiner* — Mahmoud S Ismail
(74) *Attorney, Agent, or Firm* — CANTOR COLBURN LLP

(57) ABSTRACT

An autonomous moving apparatus is an apparatus that autonomously moves toward a target object set in advance, and includes a plurality of radio wave receiving units that receive a radio wave transmitted from the autonomous moving apparatus or an external device, a radio wave prevention unit that blocks or absorbs a radio wave from a predetermined direction when viewed from the radio wave receiving units, a movement direction setting unit that sets a movement direction of the autonomous moving apparatus based on a measurement result by the plurality of radio wave receiving units, and an operation control unit that controls the autonomous moving apparatus to travel in the movement direction set by the movement direction setting unit.

5 Claims, 5 Drawing Sheets

(51) Int. Cl.
*G05D 109/20* (2024.01)
*G05D 111/30* (2024.01)

(58) Field of Classification Search
USPC .......................................................... 701/301
See application file for complete search history.

(56) References Cited

U.S. PATENT DOCUMENTS

| | | | | |
|---|---|---|---|---|
| 2021/0156947 | A1* | 5/2021 | Takizawa | .................. G01S 3/74 |
| 2024/0338037 | A1* | 10/2024 | Miyashita | ............ A01B 69/008 |

FOREIGN PATENT DOCUMENTS

| | | | | |
|---|---|---|---|---|
| JP | 2020181485 | A | 11/2020 | |
| WO | WO-2018078859 | A1 * | 5/2018 | ............. G05D 1/106 |

OTHER PUBLICATIONS

English Translation for WO-2018078859-A1 (Year: 2025).*
International Search Report for International Application No. PCT/JP2022/045293; Date of Mailing, Jan. 17, 2023, 4 pages.
Mansour et al., "Avoidance of non-localizable obstacles inecholocating bats: A robotic model"; PLOS Computational Biology; Dec. 19, 2019 , 18 pages.
PCT Written Opinion of the International Searching Authority for International Application No. PCT/JP2022/045293; Date of Mailing, Jan. 17, 2023; 7 pages.

* cited by examiner

AUTONOMOUS MOVING APPARATUS

CROSS REFERENCE TO RELATED APPLICATIONS REFERENCE

This application is a continuation under 35 U.S.C. § 120 of PCT Application No. PCT/JP2022/045293, filed on Dec. 8, 2022, which is incorporated herein by reference, and which claimed priority to Japan Patent Application No. 2021-200379 filed on Dec. 9, 2021. The present application likewise claims priority under 35 U.S.C. § 119 to Japanese Patent Application No. 2021-200379 filed on Dec. 9, 2021, the entire contents of each of which are incorporated herein by reference.

TECHNICAL FIELD

The present invention relates to an autonomous moving apparatus.

BACKGROUND

There are conventionally known autonomous traveling vehicles adopting Simultaneous Localization And Mapping (SLAM) (see Patent Literature 1). By using an external sensor such as a camera or a laser sensor and an internal sensor such as an encoder or a gyroscope in combination for each autonomous traveling vehicle, each autonomous traveling vehicle estimates a position thereof and automatically generates a travel path, and this enables automatic avoidance of an obstacle without being limited by a fixed route, for example. The autonomous traveling vehicles eliminate the necessity for infrastructure such as wires embedded in the floor or markings on the floor. SLAM using a camera may be referred to as Visual SLAM, and SLAM using a laser sensor may be referred to as LiDAR SLAM.

Further, an autonomous moving apparatus that makes a moving object autonomously travel to a target point sets a travel path that avoids contact with an obstacle by a transmitter installed in front of the moving object transmitting an audio signal and a receiver such as a microphone receiving the audio signal reflected by the obstacle (see Non-Patent Literature 1).

[Patent Literature 1] JP 2020-181485 A

[Non-Patent Literature 1] Avoidance of non-localizable obstacles in echolocating bats: A robotic model. Carl Bou Mansour, Elijah Koreman, Jan Steckel, Herbert Peremans, Dieter Vanderelst.

DETAILED DESCRIPTION

Figure 1:
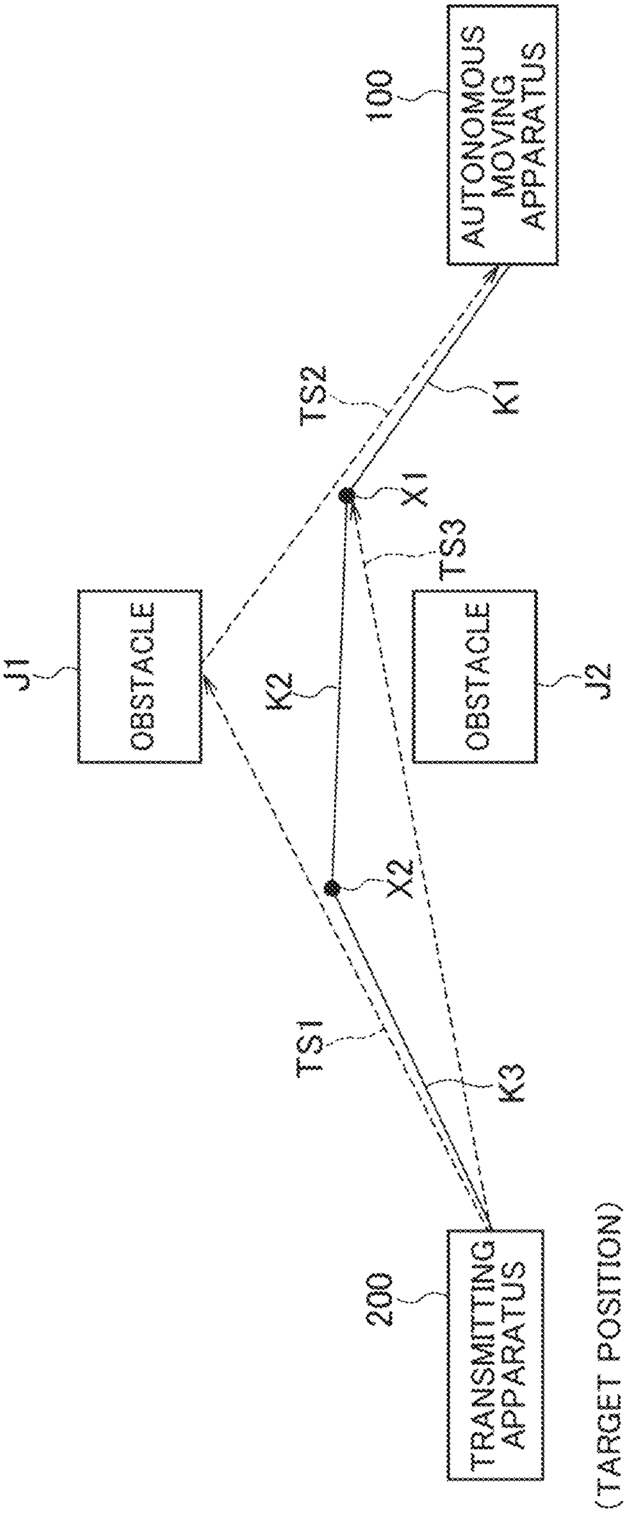
FIG. 1 is a schematic diagram for explaining an operation summary of an autonomous movement system including an autonomous moving apparatus according to a plurality of embodiments.

Hereinafter, an example of an autonomous moving apparatus according to embodiments herein and an example of an autonomous movement system as a premise thereof will be described in detail with reference to the drawings. It should be noted that embodiments described below shows exhaustive or specific examples. Numerical values, shapes, materials, constituent elements, installation positions and connection forms of constituent elements, steps, order of steps, and the like described in the following embodiments are examples and are not intended to be limited to those of the present disclosure. In particular, although a description may be given regarding an autonomous moving apparatus which is assumed to receive radio waves transmitted from an external target object in the following embodiments, the present invention is not limited thereto, and the present disclosure may be applied to an autonomous moving apparatus which is assumed to receive radio waves which are transmitted from the autonomous moving apparatus itself (host-vehicle) and reflected (see Non-Patent Literature 1).

Further, among constituent elements in the following embodiments, constituent elements not recited in independent claims indicating the most significant concept are described as optional constituent elements. Still Further, the dimensional ratios in the drawings are exaggerated for illustrative purposes and may differ from the actual ratios.

In addition, the following embodiments and a modified example thereof may include similar constituent elements, and therefore the similar constituent elements are denoted with a common reference numeral to omit duplicated descriptions thereof.

(Outline of Autonomous Moving Apparatus and Autonomous Movement System)

An autonomous moving apparatus according to embodiments has a configuration of autonomously reaching a target object in the internal space of a structure such as a factory, for example. Further, by using a propeller or the like which enables aerial movement for a moving mechanism, a flying object such as what is referred to as a drone can autonomously reach a target object, for example. Still further, the apparatus can be used for moving objects such as vehicles including passenger cars and buses, aircraft, spacecraft, ships, and submersibles, and in the internal space or, in some cases, in the external space of buildings such as houses and offices and structures such as factories.

The autonomous moving apparatus does not use an imaging device such as a camera and a radar but reaches a target object while avoiding an obstacle by using radio waves transmitted from the outside such as the target object or the apparatus itself (host apparatus). As an example, the radio waves may be high frequency electromagnetic waves, ultrasonic waves, acoustic waves, or the like in addition to general radio waves.

As an example, the autonomous moving apparatus can receive beacons or the like using a plurality of antennas thereof, estimate a direction of a target object or the like which emits the beacons or the like using a technology for estimating an incoming direction, and move in the estimated direction. When an obstacle is present outside a line-of-sight between the target object and the autonomous moving apparatus, the autonomous moving apparatus may move in a direction of beacons reflected by the obstacle, but the apparatus may receive the beacons directly received from the target object during movement. In this case, since the autonomous moving apparatus can change the movement direction thereof in a direction of the target object on the way to move toward the obstacle, the apparatus can move toward the target object while avoiding the obstacle. In addition, if the obstacle is present on the line-of-sight between the target object and the autonomous moving apparatus, the autonomous moving apparatus can detect the presence of the obstacle because the reception intensity of the beacons oscillates as the autonomous moving apparatus moves toward the obstacle. In this way, the autonomous moving apparatus can reach the target object while avoiding the obstacle by continuously moving in a direction where the reception intensity of the beacons is high while estimating the incoming direction of the beacons. This also applies to a case where the autonomous moving apparatus autonomously moves using radio waves transmitted from the autonomous moving apparatus itself.

However, as described above, when various disturbance noises such as many similar radio waves are caused, there is a problem that the accuracy of estimation of an angle, direction, or the like deteriorates. Therefore, the apparatus of the present embodiment has a radio wave prevention unit that blocks or absorbs radio waves from a predetermined direction, and a specific example thereof will be described below.

In order to explain a specific example of the radio wave prevention unit, first, a description will be given regarding an example of the autonomous movement system including the autonomous moving apparatus of the present embodiment. FIG. 1 is a diagram showing an example of an operation principle of an autonomous moving apparatus 100 according to the present embodiment and an autonomous movement system 1000 including the autonomous moving apparatus 100. First, the autonomous moving apparatus 100 receives a radio wave of a beacon transmitted from a transmitting apparatus 200 arranged at a target position. Since a line-of-sight between the autonomous moving apparatus 100 and the transmitting apparatus 200 is blocked, the autonomous moving apparatus 100 receives the radio wave of the beacon via a path K3→a path K2→a path K1. Although there is a possibility that the autonomous moving apparatus 100 receives the beacon from the line-of-sight direction also depending on the size of an obstacle J2 and a frequency of the beacon, it is assumed that the intensity of the beacon received via the path K1 is the largest. The autonomous moving apparatus 100 estimates a direction of a radio wave with the greatest intensity using a plurality of antennas mounted on the autonomous moving apparatus 100 and moves in the estimated radio wave direction.

The autonomous moving apparatus 100 moving on the path K1 toward an obstacle J1 continuously moves on the path K1 toward the obstacle J1 because the reception intensity of a beacon TS2 increases as the apparatus approaches the obstacle J1. However, when the autonomous moving apparatus 100 reaches a position X1, the transmitting apparatus 200 appears on the line-of-sight of the autonomous moving apparatus 100, and therefore the autonomous moving apparatus 100 can directly receive a beacon TS3. Therefore, since the reception intensity of the beacon TS3 is larger than that of the beacon TS2 at the position X1, the autonomous moving apparatus 100 attempts to change a movement direction in an incoming direction of the beacon TS3. The autonomous moving apparatus 100 can move on the line in the incoming direction of the beacon TS3, but in that case, there is a possibility that the autonomous moving apparatus 100 collides with the obstacle J2. Therefore, the autonomous moving apparatus 100 recognizes the presence of the obstacle J2 from a fact that the apparatus does not receive the beacon TS3 until the apparatus reaches the position X1 on the path K1 and the estimated incoming direction of the beacon TS3 with a high intensity received when the apparatus is at the position X1, and the apparatus moves in a direction of the path K2. The autonomous moving apparatus 100 moving in the direction of the path K2 can estimate the path K3 by recognizing the presence of the obstacle J1 from a fact that the incoming direction of the beacon output from the transmitting apparatus 200 is gradually widened and the change in the movement direction at the position X1. Therefore, the autonomous moving apparatus 100 changes a traveling direction toward the transmitting apparatus 200 at a position X2 and can reach the transmitting apparatus 200.

Further, according to the method described above, the autonomous moving apparatus 100 can reach the target object while avoiding the obstacles in a three-dimensional space. Therefore, there is a case where the autonomous moving apparatus 100 can be used for spatial moving objects such as drones, helicopters, and aircrafts, moving objects such as spacecraft and submersibles, and moving objects for transportation in the internal space or external space of buildings such as houses and offices and structures such as factories.

Further, some functions of the autonomous moving apparatus 100, except for a mobile mechanism and an antenna mechanism, can be incorporated into a ground moving object, a spatial moving object, or a moving object for transportation such as a vehicle. In addition, the functions of the autonomous moving apparatus 100, except for the mobile mechanism and the antenna mechanism, can be configured separately from the various moving objects described above. Furthermore, the autonomous movement system 1000 includes the autonomous moving apparatus 100 and the transmitting apparatus 200. An imaging device not related to a movement control mechanism is attached to the autonomous moving apparatus 100, and movement information of the autonomous moving apparatus 100 is transmitted to an electronic device (not shown) used by a user so that the user can monitor a movement state using the electronic device. The electronic device may be an electronic device used by a user such as a computer arranged on the cloud, or a mobile phone, PHS telephone, smartphone, or personal digital assistant carried by a user.

(Details of Radio Wave Prevention Unit)

Figure 2:
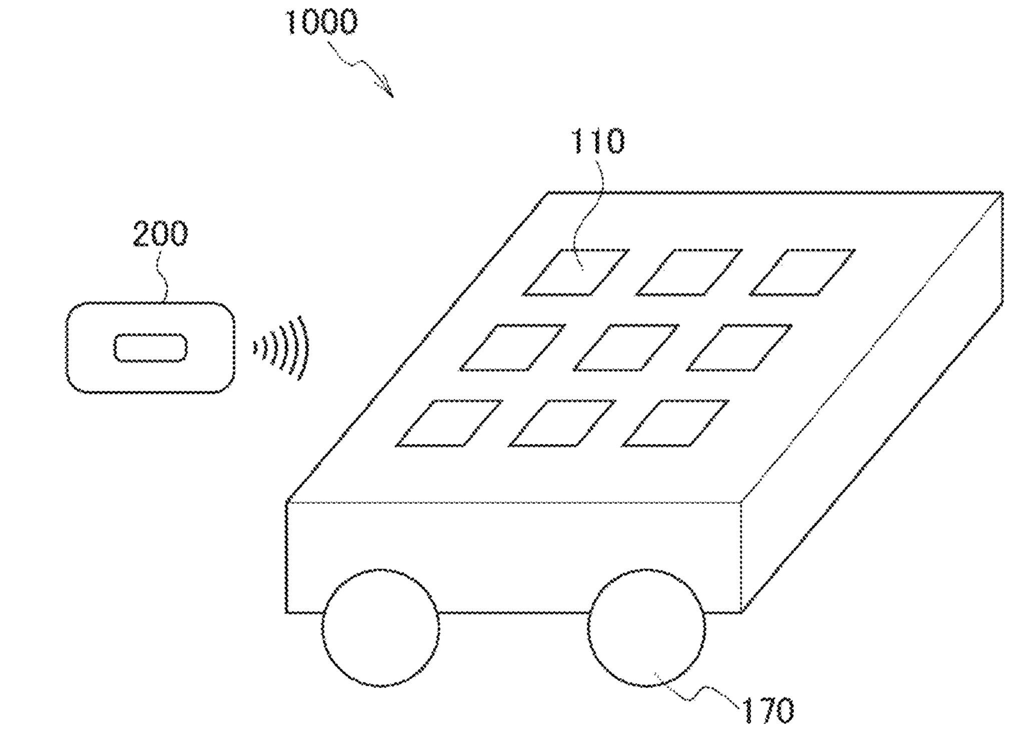
FIG. 2 is a diagram showing a conventional example of a vehicle-type autonomous moving apparatus.
Figure 3:
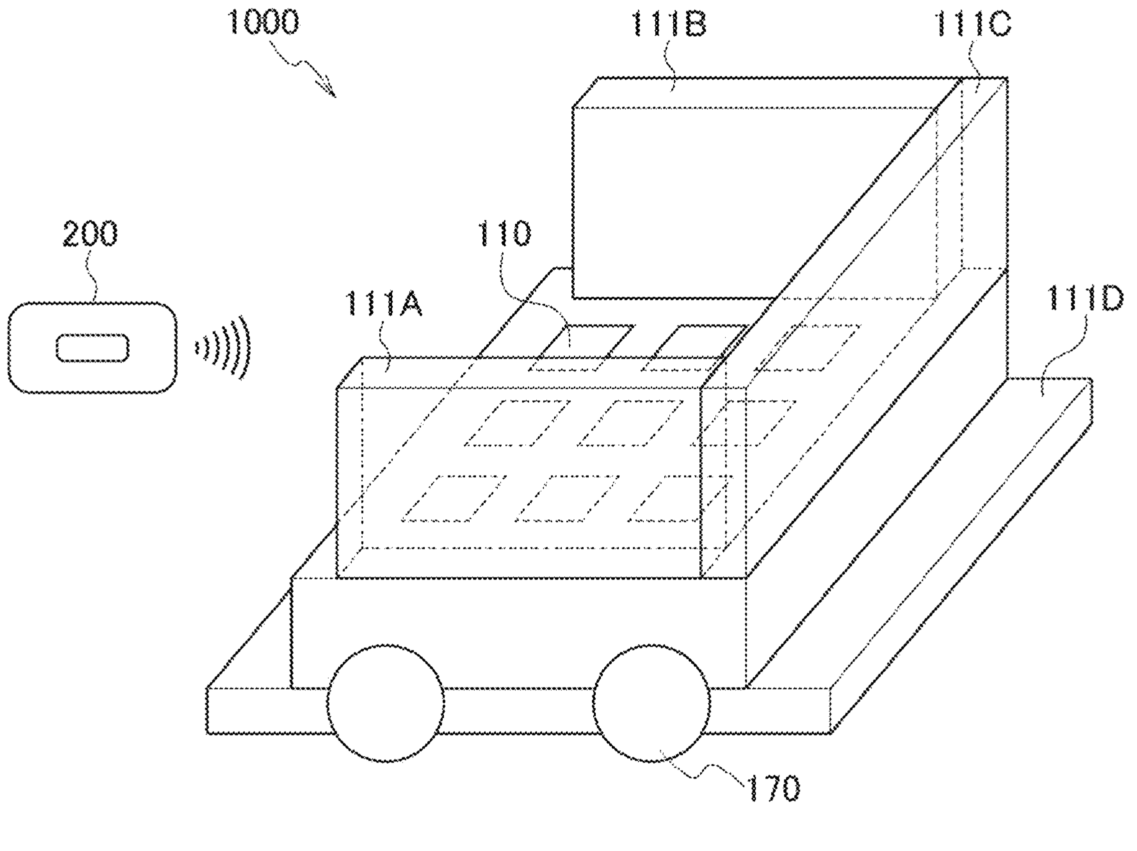
FIG. 3 is a diagram showing an example of an autonomous moving apparatus 100 having radio wave prevention units 111 of the present embodiment.

FIG. 2 is a diagram showing a conventional example of a vehicle-type autonomous moving apparatus, and FIG. 3 is a diagram showing an example of the autonomous moving apparatus 100 having radio wave prevention units 111 (111A to 111D) of the present embodiment. Reference numeral 200 in the diagrams indicates the transmitting apparatus, reference numeral 110 indicates a plurality of radio wave receiving units, reference numeral 170 indicates a moving unit such as a wheel, and reference numeral 1000 indicates the autonomous movement system.

The conventional vehicle-type autonomous moving apparatus has a problem that when a plurality of radio wave receiving units 110 receive radio waves transmitted from the transmitting apparatus 200 as shown in FIG. 2, disturbance noises such as similar radio waves from the periphery thereof are also picked up, and therefore the accuracy of the autonomous movement control easily deteriorates.

Meanwhile, as shown in FIG. 3, the autonomous moving apparatus 100 of the present embodiment has the radio wave prevention units 111 that block or absorb radio waves from a predetermined direction (in this example, side directions, rear direction, and bottom direction) when viewed from each radio wave receiving unit 110, and therefore this prevents the radio wave receiving units 110 from receiving similar radio waves that become disturbance and prevents deterioration in the accuracy of the autonomous movement control. The radio wave prevention units 111A and 111B prevent disturbance radio waves from the right and left sides, the radio wave prevention units 111C prevents disturbance radio waves from the rear side, and the radio wave prevention units 111D prevents disturbance radio waves from the bottom side. Although not shown in the diagram, the apparatus may have a radio wave prevention unit that covers an upper part so as to prevent disturbance radio waves from a top side.

The radio wave prevention units 111 may be radio wave absorbing materials or radio wave reflecting materials. In this case, it is desirable to use the radio wave absorbing materials on the inside of the radio wave prevention units 111 and the radio wave absorbing materials or radio wave reflecting materials on the outside when viewed from each radio wave receiving unit 110. This is to prevent the radio wave receiving units 110 from receiving radio waves reflected by the apparatus thereof by using the radio wave reflecting materials on the inside of the radio wave prevention units 111.

As the radio wave absorbing materials or radio wave reflecting materials, known radio wave absorbing materials or radio wave reflecting materials can be used. In addition, the radio wave absorbing materials or radio wave reflecting materials can be selected according to the limitation on the frequency, intensity, or shape of radio waves. Further, as the radio wave absorbing materials, conductive, dielectric, or magnetic radio wave absorbing materials can be used. Examples of the radio wave absorbing materials include the following.

- Attachment type: attachment type rubber sheet ferrite and carbon, and styrene foam are used as the radio wave absorbing materials.
- Structural material type: a structural material itself has functions of a radio wave absorber, and a member which has both two functions is used.
- Coating type: carbon microcoil, EV fiber, and the like are used.

A metal shield may be used as a radio wave reflection type (blocking type). Further, a combination thereof may be used. The metal shield may be used on the outside and the radio wave absorbing material may be used on the inside, for example. As an example of the structural material type, a pyramid type or a sheet type may be used.

One of typical radio wave absorbers is a ferrite type having a ferromagnetic material, and the other is a urethane type produced by impregnating carbon. The ferrite type is widely used mainly in an anechoic chamber of EMC handling a low-frequency, and a supported frequency is about several hundred kHz to 1 GHz. The urethane type covers a band of about several MHz to 110 GHz and is mainly used in an anechoic chamber of microwave to millimeter wave. As the ferrite type, which is one of the radio wave absorbers, there are many tile and ring shaped materials, and as the urethane type, pyramid shaped materials are general, but there are also flat sheet type materials and corrugated type materials. Unlike the radio wave absorbing materials, a shielding material uses not only the absorption in a material but also the reflection on a surface thereof, the resistance is very small like that of metal, and a large shielding effect is obtained by completely reflecting radio waves.

Further, the radio wave prevention units 111 blocking or absorbing radio waves from a predetermined direction when viewed from the radio wave receiving units 110 may mean arranging the radio wave absorbing materials or radio wave reflecting materials in an antenna direction other than a direction of radio waves to be received. The autonomous moving apparatus 100 may change a direction of the autonomous moving apparatus when a radio wave incoming direction differs from a traveling direction or reception direction of the autonomous moving apparatus 100. In the present embodiment, since the apparatus has the radio wave prevention units 111 which prevent radio waves from a predetermined direction, if originally desired radio waves are coming from the predetermined direction, the apparatus may not receive the radio waves, but the apparatus can receive the desired radio waves by changing the direction (rotation or the like) of the autonomous moving apparatus 100.

Figure 4:
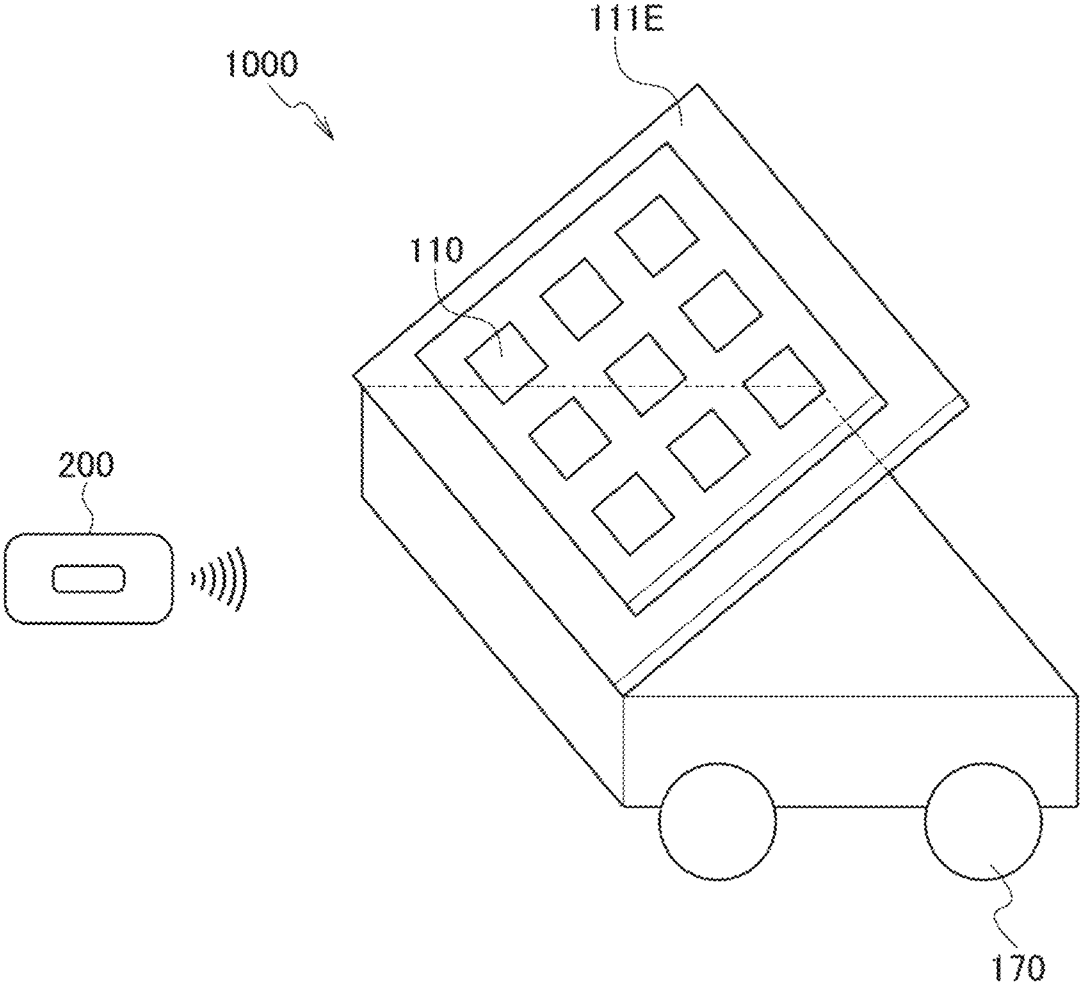
FIG. 4 is a diagram showing another example of the arrangement of the radio wave prevention units 111.

FIG. 4 is a diagram showing another example of the arrangement of the radio wave prevention units 111. As shown in FIG. 4, a member in which the radio wave prevention unit 111E is disposed on a back side of the plurality of radio wave receiving units 110 is arranged in an inclined manner to a main body of the autonomous moving apparatus 100 using a three-dimensional joint or the like, and this can prevent disturbance radio waves from the bottom direction and rear direction.

(Details of Autonomous Moving Apparatus 100)

Figure 5:
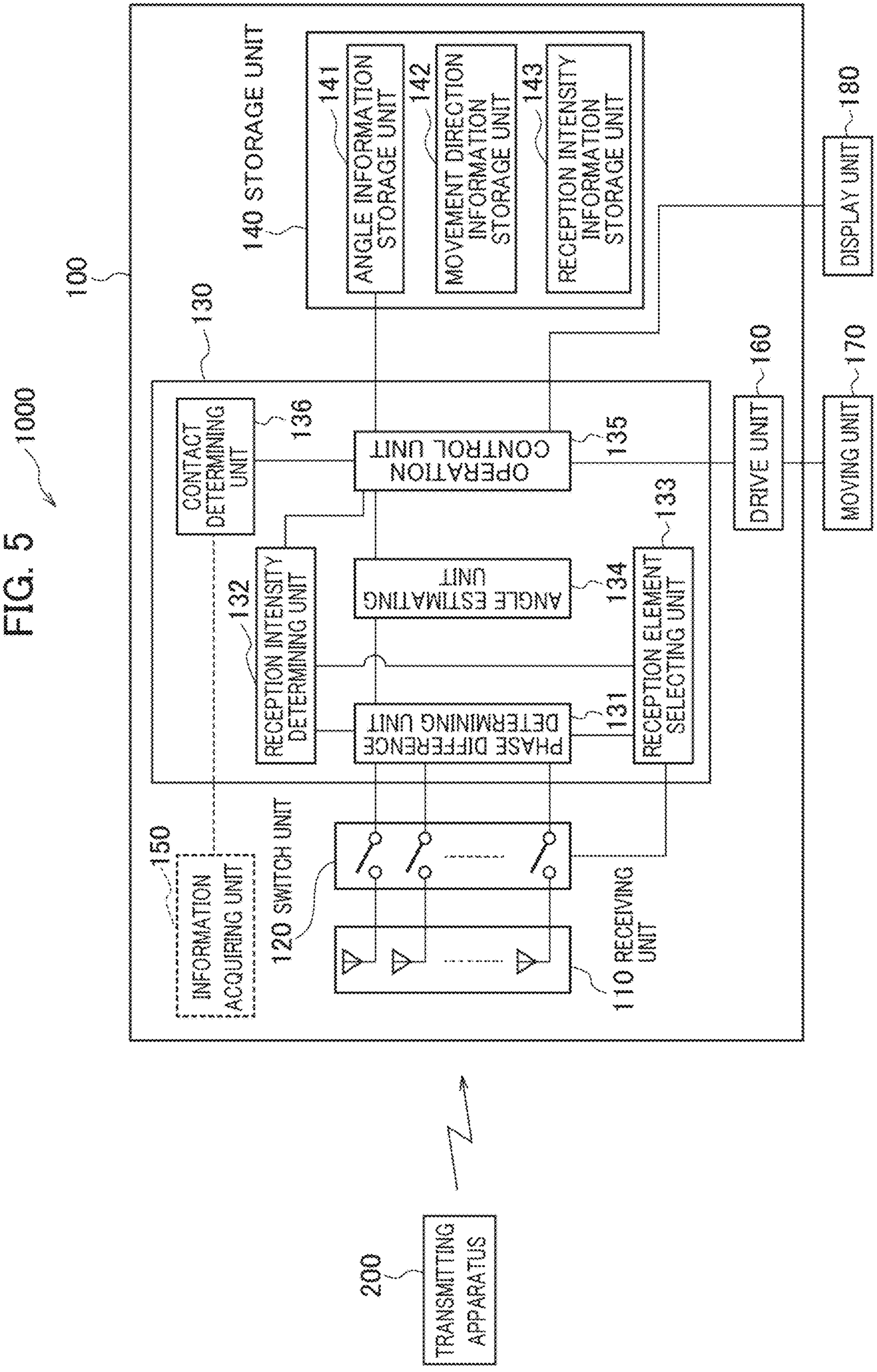
FIG. 5 is a block diagram showing an example of a configuration of an autonomous moving apparatus according to a plurality of embodiments.

A description will be given regarding an example of a detailed configuration of the autonomous moving apparatus 100 according to a plurality of embodiments with reference to FIG. 5. A configuration of the autonomous moving apparatus 100 is not limited to the above configuration. The autonomous moving apparatus 100 includes a receiving unit 110 for a plurality of antennas or the like, a switch unit 120 for selecting a reception element of the receiving unit 110, a control unit 130, a storage unit 140, and a drive unit 160. There is a possibility that the autonomous moving apparatus 100 includes an information acquiring unit 150, a moving unit 170, and a display unit 180. It is assumed that the moving unit 170 such as a wheel, a belt, a caterpillar, or a propeller is driven by means of drive information output from the drive unit 160 shown in FIG. 5 and the autonomous moving apparatus 100 moves. Although there is a possibility that the autonomous moving apparatus 100 has a plurality of information acquiring units 150, basically it is not necessary to use the information acquiring unit 150 for route search. It is assumed that the receiving unit 110 has a plurality of reception elements.

The receiving unit 110 is a radio wave receiving unit configured to be able to receive radio waves transmitted from the outside or the autonomous moving apparatus 100 itself. If the radio waves are general radio waves or high frequency electromagnetic waves, the receiving unit 110 may be an antenna. The receiving unit 110 may be an array antenna constituted by a plurality of antenna elements, for example. If the receiving unit 110 is the array antenna, the array of antenna elements constituting the array antenna may be the optional array. The antenna elements may be arranged on a line in the traveling direction of the autonomous moving apparatus 100 or in a direction intersecting or orthogonal to the traveling direction, for example. It is also possible to arrange the antenna elements so as to form a rectangular shape or an annular shape on a plane not intersecting or a plane intersecting the traveling direction of the autonomous moving apparatus 100. Further, it is also possible to array the antenna elements in a curved shape. Still further, it is not necessary that the number of array antennas is one, but the number of array antennas arranged may be more than one to achieve the enhancement of the accuracy of estimation of a radio wave incoming direction or the like. In addition, the receiving unit 110 may be constituted by a plurality of antennas having directivities in different directions. In this case, the plurality of antennas can be arranged in the same manner as the antenna elements of the array antenna. In addition, partition plates made of metal, or the like may be disposed to at least one non-directional antenna so as to be able to detect the intensity of radio waves or high frequency electromagnetic waves in a direction surrounded by the partition plates.

The switch unit 120 is a switch configured to select any one of the reception elements of the receiving unit 110 and output information on radio waves or the like received by the reception element. Therefore, the number of switches of the switch unit 120 corresponds to the number of reception elements of the receiving unit 110, and one switch may correspond to one reception element. If the receiving unit 110 is an array antenna, a plurality of antenna elements are selected, and information on the intensity and phase of radio waves received by the plurality of antenna elements is output to a phase difference determining unit 131 and a reception intensity determining unit 132, which will be described later, for example. Further, the switch unit 120 is preferably, but is not limited to, a semiconductor switch, and it is possible to employ a switch that can open and close an electrical connection of any configuration.

The control unit 130 can be implemented using a microcomputer having a Central Processing Unit (CPU) or the like. A computer program (autonomous movement program) for causing the microcomputer to function as the control unit 130 is installed in the microcomputer and is executed. As a result, the microcomputer functions as a plurality of information processing units of the control unit 130. The present specification presents an example of implementing the control unit 130 by means of software. However, it is also possible to configure the control unit 130 by preparing dedicated hardware for executing each information processing. The dedicated hardware includes devices such as an application specific integrated circuit (ASIC) and conventional circuit components that are arranged to perform functions described in the embodiment. Further, the plurality of information processing units of the control unit 130 may be configured by individual pieces of hardware. Further, the control unit 130 may also serve as an electronic control device used for controlling a moving object as an autonomous movement target.

If the autonomous moving apparatus 100 is disposed on a moving object, functions of the electronic control device for controlling a configuration not related to the movement of the moving object may include movement control functions of the autonomous moving apparatus 100, for example. In this case, an aspect may employed in which the autonomous movement program for implementing the autonomous movement functions of the autonomous moving apparatus 100 is added to an electronic control program of the electronic control device. In addition, an aspect may be employed in which hardware for implementing the autonomous movement functions of the autonomous moving apparatus 100 is added to hardware of the electronic control device. Further, at least a part of the autonomous movement program of the autonomous moving apparatus 100 may be included in at least a part of the electronic control program of the electronic control device. Still further, at least a part of hardware of the electronic control device may include at least a part of hardware of the autonomous moving apparatus 100. In addition, as described above, the autonomous movement functions of the autonomous moving apparatus 100 may be included in optional functions of the electronic control device that moves in the internal space or, in some cases, in the external space of buildings such as houses and offices and structures such as factories.

The control unit 130 includes, as the plurality of information processing units, the phase difference determining unit 131, the reception intensity determining unit 132, a reception element selecting unit 133, an angle estimating unit 134, an operation control unit 135, and a contact determining unit 136.

The phase difference determining unit 131 analyzes received signals from the plurality of reception elements of the receiving unit 110 selected by the reception element selecting unit 133 and determines the phase difference between the received signals from the difference in arrival time between the received signals. The determined phase difference is output to the angle estimating unit 134. Further, if the autonomous moving apparatus 100 stops or moves, the phase difference determining unit 131 can also determine a plurality of phase differences between a plurality of received signals.

The reception intensity determining unit 132 determines the reception intensity from the plurality of reception elements of the receiving unit 110 selected by the reception element selecting unit 133. The estimated reception intensity is output to the angle estimating unit 134. Further, the estimated reception intensity may be output to the reception element selecting unit 133. The reception intensity may be expressed in arbitrary units related to the reception intensity and may be expressed as relative information. The reception intensity may be output to the angle estimating unit 134 or the reception element selecting unit 133 as reception intensity information with any format.

The reception element selecting unit 133 selects elements for receiving radio waves or the like from the plurality of reception elements of the receiving unit 110. It is preferable that the number of reception elements selected is one or more. In order that the phase difference determining unit 131 may determine the phase difference, the reception element selecting unit 133 selects a plurality of reception elements. Further, it is possible that the reception element selecting unit 133 selects the reception elements in order and selects one or more reception elements in which the reception intensity is determined to be high by the reception intensity determining unit 132, and the angle estimating unit 134 estimates a radio wave incoming direction or the like via the phase difference determining unit 131.

The angle estimating unit 134 functions as a movement direction setting unit for setting a movement direction of the autonomous moving apparatus 100 based on measurement results by the plurality of radio wave receiving units 110. The angle estimating unit 134 can adopt any incoming direction estimation method such as an estimation method in which a complex reception response to an incoming wave is obtained in advance from the phase difference of sets of antenna elements, an evaluation function is introduced, and an incoming direction is set as an angle at which an evaluation function value is the largest, for example. Further, the angle estimating unit 134 can estimate an incoming direction from the phase differences of the plurality of antenna elements. A Multiple Signal Classification (MUSIC) and Root-MUSIC method using eigenvalues and eigenvectors of a correlation matrix can be adopted, for example. Further, an Estimation of Signal Parameters via Rotational Invariance Techniques (ESPRIT) method can be adopted.

The angle estimated in this way is stored in an angle information storage unit 141 of the storage unit 140 as angle information from an arbitrary reference axis. Still further, the estimated angle information may be stored in the angle information storage unit 141 in association with the reception intensity determined by the reception intensity determining unit 132. Furthermore, the estimated angle information may also be stored in the angle information storage unit 141 in association with the determined reception intensity and time information. The time information can be received by the receiving unit 110 from the outside of the autonomous moving apparatus 100, and the autonomous moving apparatus 100 can perform timing using a timing unit thereof (not shown).

In addition, there may be a plurality of angles estimated by the angle estimating unit 134. When there are a plurality of angles estimated, it is also possible that the angle estimating unit 134 receives the reception intensity at each angle from the reception intensity determining unit 132, associates each angle with the reception intensity, and stores the information in the angle information storage unit 141. If there is an obstacle, a radio wave reflected by the obstacle and a radio wave propagated on a line-of-sight may be received by the autonomous moving apparatus 100 at different angles, for example. Further, a radio wave reflected by the obstacle may be further reflected by another obstacle and received by the autonomous moving apparatus 100 at a further different angle. In this way, a reflected wave from the obstacle may reach the autonomous moving apparatus 100 after being reflected multiple times. Basically, the autonomous moving apparatus 100 moves in a direction where the reception intensity is high, but there is a possibility that an obstacle prevents the autonomous moving apparatus from moving in the direction where the reception intensity is high, or that a path is wrong. In this way, there is also a possibility that the autonomous moving apparatus 100 may not avoid moving in a direction of another reflected wave, and therefore if a plurality of angles are estimated, the autonomous moving apparatus 100 can associate each angle with the reception intensity and store the information in the angle information storage unit 141.

The operation control unit 135 controls the autonomous moving apparatus 100 to travel in a movement direction set by the angle estimating unit 134. That is, it is assumed that the operation control unit 135 moves the autonomous moving apparatus 100 in a direction estimated by the angle estimating unit 134. However, if the reception intensity determined by the reception intensity determining unit 132 oscillates periodically in the estimated direction, it may be determined that an obstacle is present in the estimated direction after the apparatus moves an arbitrary distance or time determined in advance. An example thereof is a case where an obstacle present between the autonomous moving apparatus 100 and a target object approaches a rear side. In such a case, since the autonomous moving apparatus 100 may receive a diffracted wave or the like, there may be a case where the reception intensity oscillates periodically due to interference between a direct wave, a reflected wave, a diffracted wave, and the like.

Further, the operation control unit 135 can calculate the past movement history of the autonomous moving apparatus 100 from movement information stored in a movement direction information storage unit 142 and generate map information. If it can be determined that the autonomous moving apparatus 100 has moved in the past also in a direction estimated from a location where the autonomous moving apparatus 100 is currently located, the operation control unit 135 can move the autonomous moving apparatus 100 in a direction estimated by the angle estimating unit 134 having the following reception intensity, for example. Further, if an incoming direction where the intensity of a received radio wave is higher is estimated during the movement, the operation control unit 135 may change the movement direction of the autonomous moving apparatus 100 based on the determination made by the contact determining unit 136 which will be described later. The operation control unit 135 can associate the movement direction with the movement time or movement distance in the movement direction and store them in the movement direction information storage unit 142. As described above, the operation control unit 135 can calculate the past movement history from the above described information stored in the movement direction information storage unit 142 and generate map information, and this can avoid the apparatus from traveling along a wrong path. Further, if the time information is associated with the movement direction information, and if a predetermined time or longer has elapsed, the operation control unit 135 may select the past movement path. This is because if the obstacle is a moving object, and if the obstacle moves from the past path or the periphery of the path, the direction may overlap with a radio wave incoming direction newly estimated due to the movement of the moving object, for example.

Further, if the radio wave intensity is very low and if a radio wave incoming direction may not be estimated by the angle estimating unit 134, the operation control unit 135 may move while maintaining the current movement direction. This is because, if a null point occurs due to the interference between an emitted radio wave and a reflected radio wave, it may be possible to estimate a radio wave incoming direction again by moving the autonomous moving apparatus 100 to another point, for example.

Further, if the operation control unit 135 receives contact prediction information or contact information from the contact determining unit 136, the operation control unit 135 can change a movement direction so as to avoid the obstacle. In this case, the changed direction may be maintained temporarily or for a predetermined period of time. The changed direction may not be an estimated direction of a radio wave where the reception intensity is highest.

In addition, the operation control unit 135 can perform machine learning or deep learning using information such as movement history information, angle information, or information on an estimated direction of a radio wave, and store machine learning result information or deep learning result information in the storage unit 140. Further, the machine learning result information or deep learning result information can be stored in the storage unit 140 in association with information such as the movement direction information, angle information, or information on the estimated direction of the radio wave.

The contact determining unit 136 may optionally determine whether there is a possibility that the autonomous moving apparatus 100 contacts an obstacle, based on information acquired by the information acquiring unit 150. Although FIG. 5 shows a case in which the apparatus includes the information acquiring unit 150, the unit can also determine whether there is a possibility that the autonomous moving apparatus 100 contacts the obstacle, without being based on the acquired information of the information acquiring unit 150. If the reception intensity in the movement direction oscillates periodically, it is possible to determine that there is the obstacle in the movement direction, for example. However, in consideration of an effect of fading or the like, if the reception intensity in the movement direction oscillates periodically after the apparatus moves for a predetermined time or distance, the contact determining unit 136 can also determine that there is an obstacle in the movement direction. In addition, if a radio wave incoming direction where the reception intensity is higher than the reception intensity in the movement direction is estimated, the contact determining unit 136 can determine that the obstacle is present at a position closer to the past movement direction between the movement direction and the radio wave incoming direction where the reception intensity is higher. If the apparatus immediately changes the movement direction to the radio wave incoming direction where the reception intensity is higher, the unit can also determine that there is a possibility that a width direction of the autonomous moving apparatus 100 contacts the obstacle. Further, if there is no change in the reception intensity, the contact determining unit 136 can determine that the autonomous moving apparatus 100 has already contacted the obstacle and may not change a direction thereof such as a forward movement or backward movement. Further, if it is estimated that the radio wave incoming direction changes in a rotation manner, the contact determining unit 136 can determine that the autonomous moving apparatus 100 contacts the obstacle and rotates. The contact determining unit 136 can notify the operation control unit 135 of the pieces of determination information.

If the apparatus includes the information acquiring unit 150, the contact determining unit 136 may optionally determine whether there is a possibility that the autonomous moving apparatus 100 contacts the obstacle, based on acquired information. The information acquiring unit 150 may be a sensor capable of detecting an obstacle in the periphery of the autonomous moving apparatus 100, such as an infrared sensor or an ultrasonic sensor, for example. When the information acquiring unit 150 detects the obstacle, the unit transmits information on the detected obstacle to the contact determining unit 136. The contact determining unit 136 transmits contact prediction information to the operation control unit 135, if it is expected that the autonomous moving apparatus 100 contacts the obstacle from the movement direction and size of the autonomous moving apparatus 100 and the obtained information on the obstacle. Further, the contact determining unit 136 transmits contact information to the operation control unit 135 if the unit determines that the autonomous moving apparatus 100 contacts the obstacle.

Further, the information acquiring unit 150 may be an imaging element such as a CCD camera. If the information acquiring unit 150 is an imaging element, an imaging unit of the imaging element is configured to face in the movement direction of the autonomous moving apparatus 100. It is also possible for the contact determining unit 136 to determine whether there is an obstacle in imaging information imaged by the imaging element and to output a determination result to the operation control unit 135. According to this configuration, it is also possible for the contact determining unit 136 to analyze obstacle information such as the position, direction, distance, and size of an obstacle from the imaging information, and therefore the operation control unit 135 can also select an appropriate radio wave incoming direction based on the obstacle information. Further, it is also possible that the apparatus includes the information acquiring unit 150 simply to provide the imaging information to a user.

The storage unit 140 is a computer-readable storage medium. The storage unit 140 may be a Read Only Memory (ROM) or an Erasable Programmable ROM (EPROM), for example. Further, the storage unit 140 may be an Electrically Erasable Programmable ROM (EEPROM), a Random Access Memory (RAM), a hard disk, or the like. The storage unit 140 may be referred to as a register, a cache, a main memory (main storage device), or the like. The storage unit 140 can store programs (program codes), software modules, and the like that can be executed for performing autonomous movement according to one embodiment of the present disclosure.

The storage unit 140 includes the angle information storage unit 141, the movement direction information storage unit 142, and a reception intensity information storage unit 143.

The angle information storage unit 141 stores angle information of a radio wave of which incoming direction is estimated by the angle estimating unit 134. The angle information may be information from a predetermined reference axis, which may be based on a physical outline of the autonomous moving apparatus 100. The outline may be expressed in two-dimensional relative coordinates other than a space in which the autonomous moving apparatus 100 moves, and a line represented by the relative coordinates may be used as the reference axis, for example. The angle information may be stored in association with estimated radio wave reception intensity information and time information in which the angle information is estimated. In the predetermined case described above, angle information other than angle information in which the reception intensity is the highest may be used, and it may be necessary to compare the information with the past angle information. In addition, the angle information may represent an angle changed from a first determined angle and may be stored in such a way that it is easy to create map information.

The movement direction information storage unit 142 can store information on a movement direction which is determined by the operation control unit 135 and in which the autonomous moving apparatus 100 actually moves in association with time information at which the movement in the movement direction starts and time information at which the movement in the movement direction ends. In addition, the time information at which the movement in the movement direction starts or time information at which the movement in the movement direction ends, and time information at which the apparatus moves in the movement direction may be stored in the movement direction information storage unit 142 in association with the movement direction information. The operation control unit 135 may reproduce the past movement path of the autonomous moving apparatus 100 based on the pieces of information. In order that the apparatus may reach a target object, the operation control unit 135 can select a path which prevents the apparatus from traveling along the same movement path, with reference to the past movement path. Further, the contact determining unit 136 may also estimate a position of an obstacle with reference to the past movement path. In addition, the control unit 130 may perform machine learning or deep learning and stores machine learning result information and deep learning result information in the storage unit 140 including the movement direction information storage unit 142. Further, the machine learning result information and deep learning result information may be stored in association with information such as movement direction information, angle information, and information on an estimated direction of a radio wave.

The reception intensity information storage unit 143 may store reception intensity information of radio waves received by a plurality of reception elements, the information being determined by the reception intensity determining unit 132. Further, the reception intensity information storage unit 143 may store the reception intensity of radio waves from the plurality of reception elements in the estimated radio wave incoming direction. Still further, the reception intensity information may be stored in the reception intensity information storage unit 143 in association with time information at which the reception intensity is determined.

The drive unit 160 includes a mechanism for driving the moving unit 170 to move the autonomous moving apparatus 100 in a direction determined by the operation control unit 135. The drive unit 160 includes a mechanism for rotating a tire if the moving unit 170 is the tire, a mechanism for turning a caterpillar if the moving unit 170 is the caterpillar, and a mechanism for rotating a propeller if the moving unit 170 is the propeller, for example. The drive unit 160 is not limited to the above aspects, but the drive unit can have any driving configuration that drives a configuration of the moving unit 170.

The moving unit 170 is a part constituting means for moving the autonomous moving apparatus 100. If the autonomous moving apparatus 100 is a vehicle, the moving unit 170 may be a wheel including a tire, a caterpillar, or the like. Further, if the autonomous moving apparatus 100 is a flying object such as a drone or a helicopter, the moving unit 170 may be a propeller. The moving unit 170 is not limited to the above aspects, but the moving unit can have any moving mechanism capable of moving the autonomous moving apparatus 100.

The display unit 180 can optionally be attached to the autonomous moving apparatus 100 or may be installed in a monitor space separated from the autonomous moving apparatus 100 to enable confirmation of image information in the movement direction of the autonomous moving apparatus 100. As described above, it is also possible to confirm whether the autonomous moving apparatus 100 moves normally by confirming image information output to the display unit 180.

The transmitting apparatus 200 can be arranged in the periphery of a target object or attached to the target object. Further, the transmitting apparatus 200 may be the target object. Information output by the transmitting apparatus 200 needs to be information that can be received by the receiving unit 110 of the autonomous moving apparatus 100. Examples of the information output by the transmitting apparatus 200 include, but are not limited to, radio waves and high frequency electromagnetic waves, as described above, but may also include electromagnetic waves, vibration waves, and the like of any frequency. Still further, it is not necessary that the frequency of radio waves, vibration waves, and the like is fixed, and the frequency can be changed periodically or randomly. Furthermore, the transmitting apparatus 200 may be configured to repeatedly sweep the frequency in a predetermined frequency range. The frequency fluctuation may make it easier for the autonomous moving apparatus 100 to determine the presence of an obstacle even if the apparatus does not include the information acquiring unit 150. In addition, the transmitting apparatus 200 may be an electronic device used by a user such as a mobile phone, PHS telephone, smartphone, or personal digital assistant carried by the user.

The autonomous moving apparatus 100 according to the embodiment may further include a transmitting unit (not shown) that transmits, to the outside, arrival information to a target object or abnormality information during movement in a wired or wireless manner. The transmitting unit can wirelessly transmit the arrival information or abnormality information to an external electronic device by means of what is referred to as mobile communication. Wireless communication may be performed which is based on a near-field communication standard of at least one of wireless LAN and Bluetooth (registered trademark). Further, the transmitting unit may communicate with the outside by means of connection using a cable (for example, USB cable, optical cable). According to this kind of a configuration, it is possible for another device to perform the following processing in response to reception of the arrival information or abnormality information.

A transmission destination of the transmitting unit may be an electronic device used by a user such as a computer arranged on the cloud, or a mobile phone, PHS telephone, smartphone, or personal digital assistant carried by the user, for example.

According to the above configuration, a simple configuration can be adopted for a moving apparatus such as an unmanned transport vehicle, and the apparatus can autonomously reach a target object while reducing the cost.

(peration Example of Self-Diagnosis Device and Self-Diagnosis System)

Figure 6:
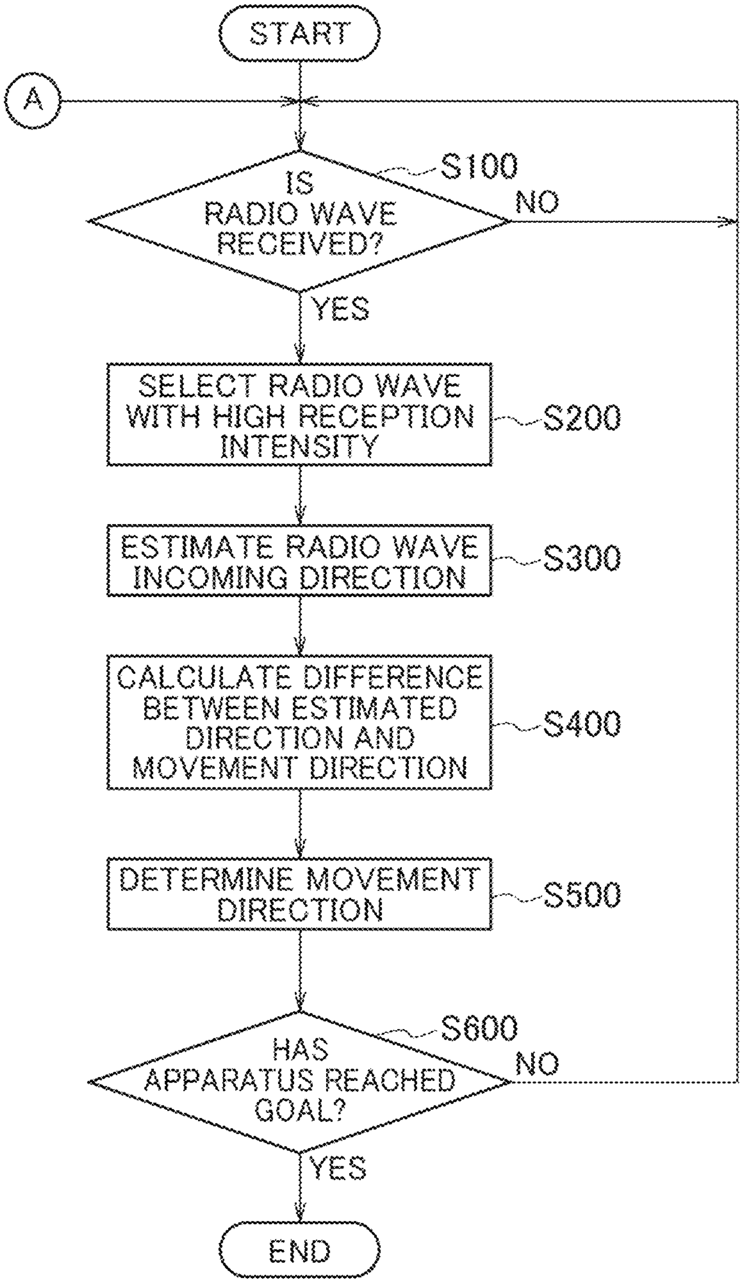
FIG. 6 is a flowchart showing an example of an operation of an autonomous movement system using the autonomous moving apparatus shown in FIG. 5.

Next, with reference to FIG. 6, a description will be given regarding an example of an outline of the basic operation of the autonomous moving apparatus 100 and autonomous movement system 1000 shown in FIG. 5 using a flowchart.

In step S100, the reception intensity determining unit 132 determines whether the reception elements of the receiving unit 110 have received radio waves which are more than a predetermined threshold. The predetermined threshold is an arbitrary value that can be determined in advance in the autonomous moving apparatus 100 or autonomous movement system 1000. In addition, a reception element for searching the reception intensity may be determined in advance or randomly selected. If the reception elements receive the radio waves which are more than the predetermined threshold (YES in step S100), the process of the autonomous moving apparatus 100 proceeds to step S200. If the radio waves received by the reception elements are not more than the predetermined threshold (NO in step S100), the autonomous moving apparatus 100 repeats step S100.

In step S200, the reception intensity determining unit 132 measures and determines the reception intensity for each reception element and controls the reception element selecting unit 133 so as to select a reception element in which the reception intensity of radio waves is high. The number of reception elements selected can be any number. Next, the process of the autonomous moving apparatus 100 proceeds to step S300.

In step S300, the phase difference determining unit 131 measures and determines the phase difference of received radio waves between the reception elements, and outputs the phase difference to the angle estimating unit 134. The angle estimating unit 134 that has received the phase difference estimates a radio wave incoming direction with reference to a distance between the reception elements and, if necessary, the reception intensity. The estimated radio wave incoming direction can also be indicated using coordinates of a space where the reception elements are arranged. The estimated radio wave incoming direction is output to the operation control unit 135 from the angle estimating unit 134. Next, the process of the autonomous moving apparatus 100 proceeds to step S400.

In step S400, the operation control unit 135 calculates the difference between the radio wave incoming direction, and a direction in which the autonomous moving apparatus 100 moves or a traveling direction of the autonomous moving apparatus 100 at a stop position. Next, the process of the autonomous moving apparatus 100 proceeds to step S500.

In step S500, the operation control unit 135 determines a movement direction of the autonomous moving apparatus 100 and controls the drive unit 160 and moving unit 170 such that the apparatus moves in the determined movement direction. Next, the process of the autonomous moving apparatus 100 proceeds to step S600.

In step S600, the operation control unit 135 determines whether the autonomous moving apparatus 100 has reached a target object. It may be configured that a radio wave is emitted by a target object, or it may be configured that a radio wave is emitted by the transmitting apparatus 200 arranged in the periphery of the target object. If the autonomous moving apparatus 100 has reached the target object (YES in step S600), the autonomous moving apparatus 100 ends the process. Alternatively, if the autonomous moving apparatus 100 has not reached the target object (NO in step S600), the process of the autonomous moving apparatus 100 returns to step S100.

According to the above configuration, a simple configuration can be adopted for the moving apparatus such as an unmanned transport vehicle, and the apparatus can autonomously reach the target object while reducing the cost.

(Features and Effects of Embodiment)

Features and effects of the autonomous moving apparatus 100 according to the present embodiment will be described below.

The autonomous moving apparatus 100 according to the embodiment of the present disclosure is an autonomous moving apparatus 100 that moves autonomously toward the target object set in advance, and include the plurality of radio wave receiving units 110 that receive radio waves transmitted from the autonomous moving apparatus 100 or the transmitting apparatus 200, the radio wave prevention unit 111 that blocks or absorbs a radio wave from a predetermined direction when viewed from the radio wave receiving units 110, the angle estimating unit 134 that sets the movement direction of the autonomous moving apparatus 100 based on measurement results by the plurality of radio wave receiving units 110, and the operation control unit 135 that controls the autonomous moving apparatus 100 to travel in the movement direction set by the angle estimating unit 134.

According to the above configuration, even if various disturbance noises such as similar radio waves are caused, it is possible to prevent deterioration in the accuracy of the autonomous movement control without increasing the amount of information calculation.

Further, the radio wave prevention unit 111 of the autonomous moving apparatus 100 according to the embodiment of the present disclosure may include radio wave absorbing materials or radio wave reflecting materials.

According to the above configuration, the deterioration in the accuracy of the autonomous movement control can be prevented by absorbing or reflecting disturbance radio waves from an unnecessary direction.

Further, the radio wave prevention unit 111 of the autonomous moving apparatus 100 according to the embodiment of the present disclosure may be disposed on at least one of an opposite side of the traveling direction of the autonomous moving apparatus 100, lateral sides, a top side, and a bottom side of the autonomous moving apparatus 100.

According to the above configuration, it is possible to receive radio waves at least in the traveling direction while preventing radio wave from unfavorable directions such as an opposite side of the traveling direction, lateral sides, a top side, and a bottom side of the apparatus, and therefore it is possible to contribute to the prevention of deterioration in the accuracy of the autonomous movement control.

In addition, the radio wave prevention unit 111 of the autonomous moving apparatus 100 according to the embodiment of the present disclosure may be a member according to at least one of the limitation on the frequency, intensity, and shape of radio waves.

With the above configuration, it is possible to cut noise other than the frequency of a radio wave to be received, facilitate reception by the intensity of the radio wave to be received, and prevent undesirable radio waves according to the shape of the autonomous moving apparatus 100.

Further, the operation control unit of the autonomous moving apparatus 100 according to the embodiment of the present disclosure may change a direction of the autonomous moving apparatus when a radio wave incoming direction differs from a traveling direction or reception direction of the autonomous moving apparatus 100.

With the above configuration, even when the radio wave prevention unit 111 prevents desired radio waves, the apparatus can receive the desired radio waves by changing a direction thereof.

Further, the autonomous moving apparatus 100 according to the embodiment of the present disclosure may be an autonomous traveling vehicle or drone.

With the above configuration, a simple configuration can be adopted for an autonomous traveling vehicle or drone and it is possible to prevent deterioration in the accuracy of the autonomous movement control without increasing the amount of information calculation.

(Supplement to Embodiment)

Although the embodiment of the present invention has been described above, the disclosed invention is not limited to the embodiment, and those skilled in the art will understand various modified examples, correction examples, alternative examples, substitution examples, and the like. Although a description has been given using specific numerical value examples to facilitate understanding of the invention, unless otherwise specified, these numerical values are merely examples and any appropriate values may be used. The categorization of items in the above description is not essential to the present invention, matters described in two or more items may be used in combination as appropriate, or a matter described in one item may be applied (as long as there is no contradiction) to a matter described in another item. Boundaries of functional or processing units in a functional block diagram do not necessarily correspond to boundaries of physical components. The operation of a plurality of functional units may be performed by a single physical component, or the operation of a single functional unit may be performed by a plurality of physical components. With respect to the processing procedure described in the embodiment, the order of processing may be changed as long as there is no contradiction. For the convenience of processing description, the autonomous moving apparatus 100 has been described using a functional block diagram, but the apparatus may be implemented in hardware, software, or a combination thereof. Software operated by a processor in the autonomous moving apparatus 100 according to the present embodiment may be stored in a random access memory (RAM), flash memory, read-only memory (ROM), EPROM, EEPROM, and register. Further, software operated by a processor in the autonomous moving apparatus 100 according to the present embodiment may be stored in a hard disk (HDD), removable disk, CD-ROM, database, server, and any other suitable storage medium.

Further, notification of information is not limited to the aspects/embodiment described in the present disclosure and may be performed using other methods such as physical layer signaling, higher layer signaling, other signals, or a combination thereof, for example. In addition, notification of predetermined information (for example, notification of "is X") is not limited to being performed explicitly, and it may be performed implicitly (for example, without notifying the predetermined information).

In each aspect/embodiment described in the present disclosure, a plurality of systems may be combined and applied.

The order of the processing procedures, sequences, flowcharts, and the like of each aspect/embodiment described in the present disclosure may be exchanged as long as there is no contradiction. The methods described in the present disclosure present the elements of the various steps using an exemplary order, but an order is not limited to the presented specific order, for example.

Information, signals, or the like described in the present disclosure may be output from a higher layer (or lower layer) to a lower layer (or higher layer).

The input/output information or the like may be stored in a specific location such as a memory, managed in a management table, or overwritten, updated, or added to, for example. The information or the like may be deleted after outputting. The input information or the like may be transmitted to another device.

The determination in the present disclosure may be made by comparison of numerical values such as comparison with a predetermined value, may be made by using a value (0 or 1) represented by one bit, or by truth-value (Boolean: true or false), for example.

Each of the aspects/embodiment described in the present disclosure may be used separately or in combination or may be switched in accordance with the execution.

Software should be interpreted broadly to mean a code, a code segment, a program code, a program, a subprogram, a software module, an application, a software application, a software package, a routine, a subroutine, an object, an executable file, an execution thread, a procedure, a function, and the like, regardless of being referred to as firmware, middleware, microcode, hardware description language, or some other names.

Further, software, information and the like may be transmitted and received via a transmission medium. If software is transmitted from a website, a server, or another remote source by using a wired technology, the wired technology is included within the definition of the transmission medium. Examples of the wired technology include a coaxial cable, an optical fiber cable, a twisted pair cable, and a digital subscriber line. In addition, if software, information, and the like are transmitted from a website, a server, or another remote source by using a wireless technology such as infrared light or microwave, the wireless technology is also included within the definition of the transmission medium.

Information, signals, bits, or the like described in the present disclosure may be represented by using any of a variety of different technologies, that is, may be represented by a voltage, a current, an electromagnetic wave, a magnetic field or magnetic particles, an optical field or photons, or a desired combination thereof.

It should be noted that the terms described in the present disclosure and terms necessary for understanding the present disclosure may be replaced with terms having the same or similar meanings.

Further, information, parameters, and the like described in the present disclosure may be represented using a relative value from a predetermined value or using an absolute value or may be represented using corresponding other information.

Names used for the above parameters are not restrictive names in any respect. Since various information elements can be identified by any suitable names, the various names allocated to these various information elements shall not be restricted in any way.

As used in the present disclosure, the terms "determining" and "deciding" may encompass a wide variety of actions such as judging, calculating, computing, processing, and deriving, for example. Further, the terms "determining" and "deciding" may include investigating, searching, inquiring, or ascertaining a table or database, for example. Still further, the terms "determining" and "deciding" may include receiving (for example, reception of information), transmitting (for example, transmission of information), inputting, or outputting. Furthermore, the terms "determining" and "deciding" may include accessing data in a memory, for example. In addition, the terms "determining" and "deciding" may include resolving, selecting, choosing, establishing, comparing, or the like. In other words, the terms "determining" and "deciding" may include "determining" and "deciding" some action. The term "determining (deciding)" may be read as "assuming", "expecting", or "considering".

The term "connected" or any variations thereof means any direct or indirect connection between two or more elements. One or more intermediate elements may be present between two elements that are "connected" to each other. When used in the present disclosure, the two elements can be "connected" to each other by using at least one of one or more wires, one or more cables, and one or more printed electrical connections. Further, the two elements can be "connected" to each other by using, as some non-limiting and non-exhaustive examples, electromagnetic energy having wavelengths in a radio frequency domain, a microwave region, and a light (both visible and invisible) region.

As used in the present disclosure, the phrase "based on" does not mean "based only on" unless explicitly stated otherwise. In other words, the phrase "based on" means both "based only on" and "based at least on".

The "unit" in the configuration of each apparatus may be replaced with "means", "circuit", "device", and the like.

In the present disclosure, the used terms "include", "including", and variants thereof are intended to be inclusive in a manner similar to the term "comprising". Further, the term "or" used in the present disclosure is intended not to be an exclusive OR.

Throughout the present disclosure, for example, during translation, if articles such as a, an, and the in English are added, the present disclosure may include that a noun following these articles is used in plural.

In the present disclosure, the wording "A and B are different" may mean "A and B are different from each other". It should be noted that the wording may mean "A and B are each different from C".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration and does not have any restrictive meaning to the present disclosure.

The invention claimed is:

1. An autonomous moving apparatus that autonomously moves toward a target object set in advance, the autonomous moving apparatus comprising:

a plurality of radio wave receiving units that receive a radio wave transmitted from the autonomous moving apparatus or the outside;

a radio wave prevention unit that blocks or absorbs a radio wave from a predetermined direction when viewed from the radio wave receiving units;

a movement direction setting unit that estimates a movement direction of the autonomous moving apparatus based on a measurement result by the plurality of radio wave receiving units; and an operation control unit that controls the autonomous moving apparatus to travel in the movement direction set by the movement direction setting unit, the radio wave prevention unit includes a radio wave absorbing material or a radio wave reflecting material.

2. The autonomous moving apparatus according to claim 1, wherein the radio wave prevention unit is disposed on at least one of an opposite side of a traveling direction of the autonomous moving apparatus, lateral sides of the autonomous moving apparatus, a top side of the autonomous moving apparatus, and a bottom side of the autonomous moving apparatus.

3. The autonomous moving apparatus according to claim 1, wherein the radio wave prevention unit is a member according to at least one of limitation on a frequency of the radio wave, limitation on intensity of the radio wave, and limitation on a shape of the radio wave.

4. The autonomous moving apparatus according to claim 1, wherein the operation control unit changes a direction of the autonomous moving apparatus if an incoming direction of the radio wave differs from the traveling direction or a reception direction of the autonomous moving apparatus.

5. The autonomous moving apparatus according to claim 1, wherein the autonomous moving apparatus is an autonomous traveling vehicle or a drone.

* * * * *